United States Patent
Smith et al.

(10) Patent No.: US 9,387,881 B2
(45) Date of Patent: Jul. 12, 2016

(54) LAND VEHICLE STEERING SYSTEM INCLUDING SELECTIVE INBOARD AND OUTBOARD WHEELS ADJUSTMENT

(71) Applicants: James A. Smith, Lafayette, IN (US); James L. Jackson, Uniondale, IN (US); Daniel Pitstick, Otterbein, IN (US)

(72) Inventors: James A. Smith, Lafayette, IN (US); James L. Jackson, Uniondale, IN (US); Daniel Pitstick, Otterbein, IN (US)

(73) Assignee: Terra Drive Systems, Inc., Brookston, IN (US)

( * ) Notice: Subject to any disclaimer, the term of this patent is extended or adjusted under 35 U.S.C. 154(b) by 0 days.

(21) Appl. No.: 14/082,533

(22) Filed: Nov. 18, 2013

(65) Prior Publication Data

US 2015/0137471 A1 May 21, 2015

(51) Int. Cl.
*B62D 7/16* (2006.01)
*B60G 17/00* (2006.01)
*B62D 9/00* (2006.01)

(52) U.S. Cl.
CPC *B62D 7/16* (2013.01); *B60G 17/00* (2013.01); *B62D 9/00* (2013.01)

(58) Field of Classification Search
CPC .......... B60G 3/18; B60G 7/003; B60G 17/00; B60G 21/00; B60G 2300/08; B60G 2300/083; B60G 2300/40; B60G 2400/257; B62D 49/0678; B62D 61/00; B62D 9/00; B62D 7/16

See application file for complete search history.

(56) References Cited

U.S. PATENT DOCUMENTS

| | | | |
|---|---|---|---|
| 2,480,309 A | 8/1949 | Tapp et al. | |
| 3,027,963 A | 4/1962 | Nicholson | |
| 3,105,699 A | 10/1963 | Peras | |
| 3,306,390 A * | 2/1967 | Jamme | 180/209 |
| 3,587,767 A | 6/1971 | Gamaunt | |
| 3,899,037 A * | 8/1975 | Yuker | 180/6.48 |
| 4,109,747 A | 8/1978 | Hornagold et al. | |
| 4,241,803 A * | 12/1980 | Lauber | 180/8.1 |
| 4,395,191 A * | 7/1983 | Kaiser | 414/694 |
| 5,137,101 A | 8/1992 | Schaeff | |
| 5,335,739 A * | 8/1994 | Pieterse | B62D 9/00 180/242 |
| 6,199,769 B1 * | 3/2001 | Weddle | 239/172 |
| 6,311,795 B1 * | 11/2001 | Skotnikov et al. | 180/8.3 |
| 6,325,396 B1 | 12/2001 | Romig | |
| 7,389,998 B2 | 6/2008 | Kondo et al. | |
| 8,051,940 B2 | 11/2011 | Ziech | |

(Continued)

OTHER PUBLICATIONS

Written Opinion of the International Searching Authority in related PCT/US2014/064720.

(Continued)

*Primary Examiner* — Barry Gooden, Jr.
(74) *Attorney, Agent, or Firm* — George Pappas

(57) ABSTRACT

A land vehicle steering system capable of selectively moving the left and right steerable wheels inboard and outboard of the vehicle, and selectively adjusting the distance between the left and right steerable wheels. The steering system includes left and right steering assemblies. Each assembly includes: a pivot arm pivotally secured to the vehicle about a first pivot axis; a first hydraulic cylinder secured between the pivot arm and the vehicle; a wheel end pivotally secured to the pivot arm about a steering axis; and, a second hydraulic cylinder secured between the wheel end and the pivot arm. Actuation of the first hydraulic cylinders rotates the pivot arms about their first pivot axes and moves the wheel ends inboard and outboard of the vehicle. Actuation of the second hydraulic cylinders rotates the wheel ends and steerable wheels thereon relative to their pivot arm for steering the vehicle.

14 Claims, 15 Drawing Sheets

(56) References Cited

U.S. PATENT DOCUMENTS

| | | | |
|---|---|---|---|
| 8,256,780 | B2 | 9/2012 | Shibuya |
| 8,474,842 | B2 | 7/2013 | Shibuya |
| 8,888,122 | B2* | 11/2014 | Berry ............................ 280/638 |
| 2003/0155735 | A1 | 8/2003 | Takahashi et al. |
| 2005/0212253 | A1* | 9/2005 | Donaldson .................... 280/283 |
| 2006/0170176 | A1* | 8/2006 | Wubben et al. ........ 280/124.127 |
| 2008/0150248 | A1* | 6/2008 | Mair ........................ B62D 7/20 280/93.512 |
| 2008/0190682 | A1* | 8/2008 | Mahy et al. ................... 180/209 |
| 2010/0075727 | A1* | 3/2010 | Coers et al. ................... 460/150 |
| 2011/0148053 | A1* | 6/2011 | Motebennur et al. ........ 280/6.16 |
| 2011/0272905 | A1 | 11/2011 | Mackin et al. |
| 2011/0274378 | A1 | 11/2011 | Mackin et al. |
| 2012/0318588 | A1* | 12/2012 | Kroese et al. ................... 180/41 |
| 2013/0062133 | A1 | 3/2013 | Budweil |
| 2013/0241161 | A1* | 9/2013 | Berry .......................... 280/5.52 |
| 2014/0138167 | A1* | 5/2014 | Bebernes ............. B62D 11/005 180/6.48 |
| 2014/0327221 | A1* | 11/2014 | Berry et al. ............ 280/124.128 |

OTHER PUBLICATIONS

International Search Report in related PCT/US2014/064720.

* cited by examiner

LAND VEHICLE STEERING SYSTEM INCLUDING SELECTIVE INBOARD AND OUTBOARD WHEELS ADJUSTMENT

BACKGROUND OF THE INVENTION

1. Field of the Invention

The present invention relates to the field of steering systems for land vehicles. More particularly, the present invention relates to steering systems wherein the steerable wheels are selectively movable inboard and outboard of the vehicle frame, and wherein the distance between the steerable wheels is selectively adjustable.

2. Background

Most all land vehicles include steerable wheels which are rotatable about a generally vertical steering axis, typically generally perpendicular to the wheels axis of rotation, for turning the wheels and thereby directing the vehicle in a desired direction. In this regard, many steering systems have been devised and are currently in use. For example, the steerable wheels can be mounted to wheel ends such as driven wheel motors and non-driven stub axles or spindles which are pivotally supported on a yoke with a king pin. By rotating the wheel ends about the king pin/steering axis, the steerable wheels can be turned for directing the vehicle as desired. Of course, in vehicles having a pair of spaced apart steerable wheels, one on each of the left and right sides of the vehicle, the left and right wheel ends are simultaneously turned in the desired direction.

In most vehicles, the steerable wheels are fixed relative to the vehicle frame or chassis. That is, the steerable wheels cannot be moved inboard or outboard and the distance between the left and right steerable wheels is fixed.

It is oftentimes desirable to adjust the steerable wheels inboard/outboard position and/or the distance between the left and right steerable wheels. For example, in construction and off road vehicles, it may be desirable to sometimes increase the distance between the steerable wheels and thereby increase the stability of the vehicle. In agricultural vehicles such as combines and chemical spraying vehicles, it may be desirable to adjust the steerable wheels inboard/outboard location and/or the distance between the left and right steerable wheels so as to place the wheels between the crop rows.

Although steering apparatus have been devised for adjusting the distance between the left and right steerable wheels, a need exists for an improved steering system capable of adjusting the steerable wheels inboard/outboard locations and/or the distance between the left and right steerable wheels.

SUMMARY OF THE INVENTION

The steering system of the present invention is capable of selectively independently moving the left and right steerable wheels inboard and outboard of the vehicle and selectively adjusting the distance between the left and right steerable wheels.

In one form thereof, the present invention is directed to a steering system including left and right steering assemblies for a land vehicle. Each steering assembly includes a pivot arm pivotally secured to the vehicle about a first pivot axis. A first selectively extendable and retractable mechanism is secured between the pivot arm and the vehicle. A wheel end is pivotally secured to the pivot arm about a steering axis whereupon a steerable wheel is mountable. A second selectively extendable and retractable mechanism is secured between the wheel end and the pivot arm. Accordingly, actuation of the first mechanism rotates the pivot arm about the first pivot axis and moves the wheel end inboard and outboard of the vehicle, and actuation of the second mechanism rotates the wheel end relative to the pivot arm for steering the vehicle.

Preferably, the steering assembly selectively extendable and retractable mechanisms are hydraulic cylinders; and, the steering assembly wheel end is a hydraulically driven wheel motor or a non-driven stub axle.

Also preferably, the steering assembly includes a suspension means. In this regard, the steering assembly pivot arm includes a first control arm pivotally secured about the first pivot axis and a second control arm pivotally secured to the upper control arm about a suspension axis. An air spring is provided between the first control arm and the second control arm. The wheel end is pivotally secured to the second control arm, and the second mechanism is secured between the wheel end and the second control arm. Also, the steering assembly first mechanism is secured between the second control arm and the vehicle. Preferably, the suspension axis is generally perpendicular to the first pivot axis.

In another form thereof, the present invention is directed to a steering system including left and right steering assemblies for a land vehicle. Each steering assembly includes a pivot arm pivotally secured to the vehicle about a first pivot axis whereby the pivot arm is moveable between inboard and outboard positions. A wheel end is pivotally secured to the pivot arm about a steering axis whereupon a steerable wheel is mountable. A selectively extendable and retractable steering mechanism is secured between the wheel end and the pivot arm. Accordingly, rotation of the pivot arm about the first pivot axis moves the wheel end inboard and outboard of the vehicle, and actuation of the steering mechanism rotates the wheel end relative to the pivot arm for steering the vehicle.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
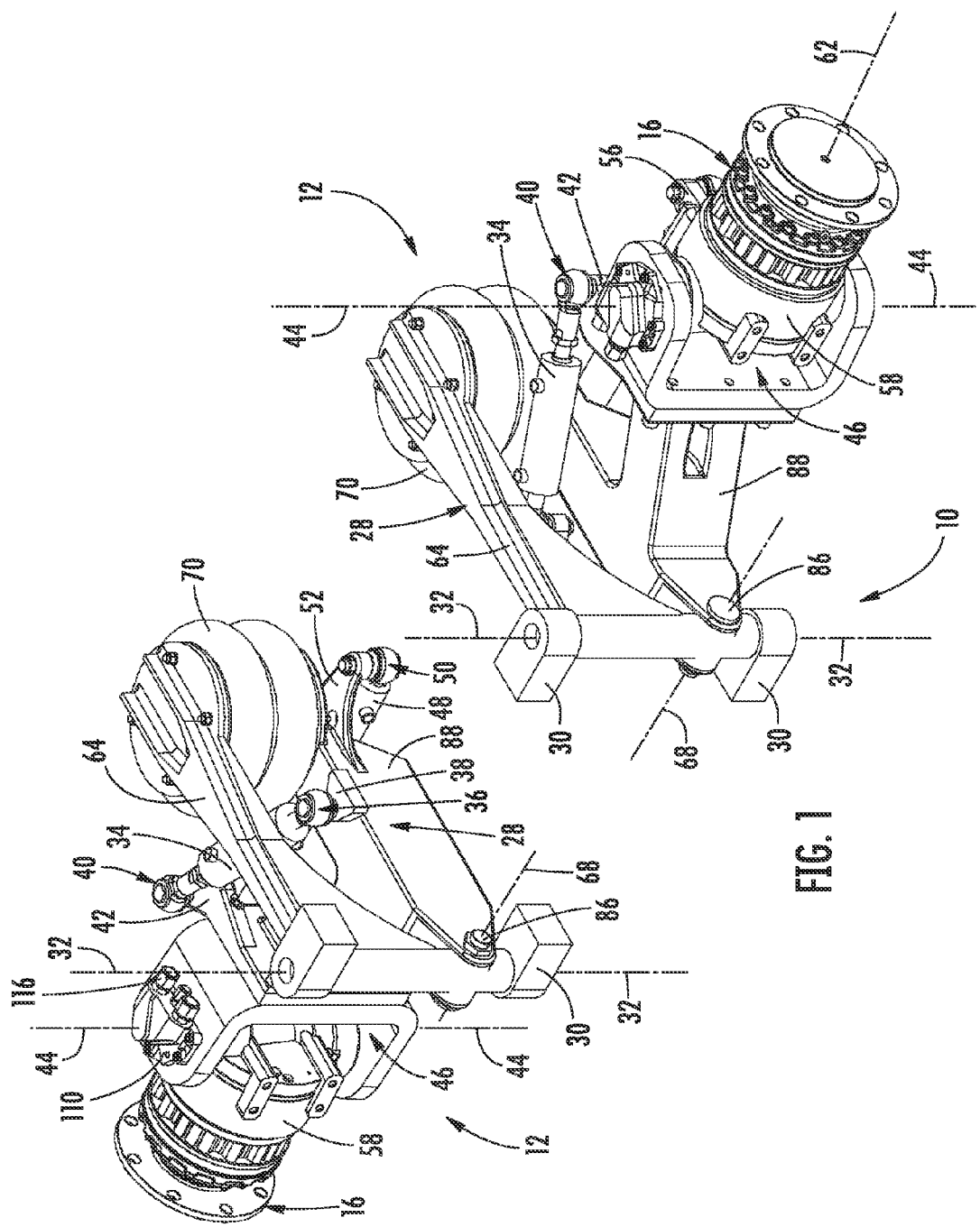
FIG. 1 is a perspective view of a land vehicle steering system constructed in accordance with the principles of the present invention and shown as would be secured to a land vehicle, but with the land vehicle removed for better illustrating the steering system.
Figure 2:
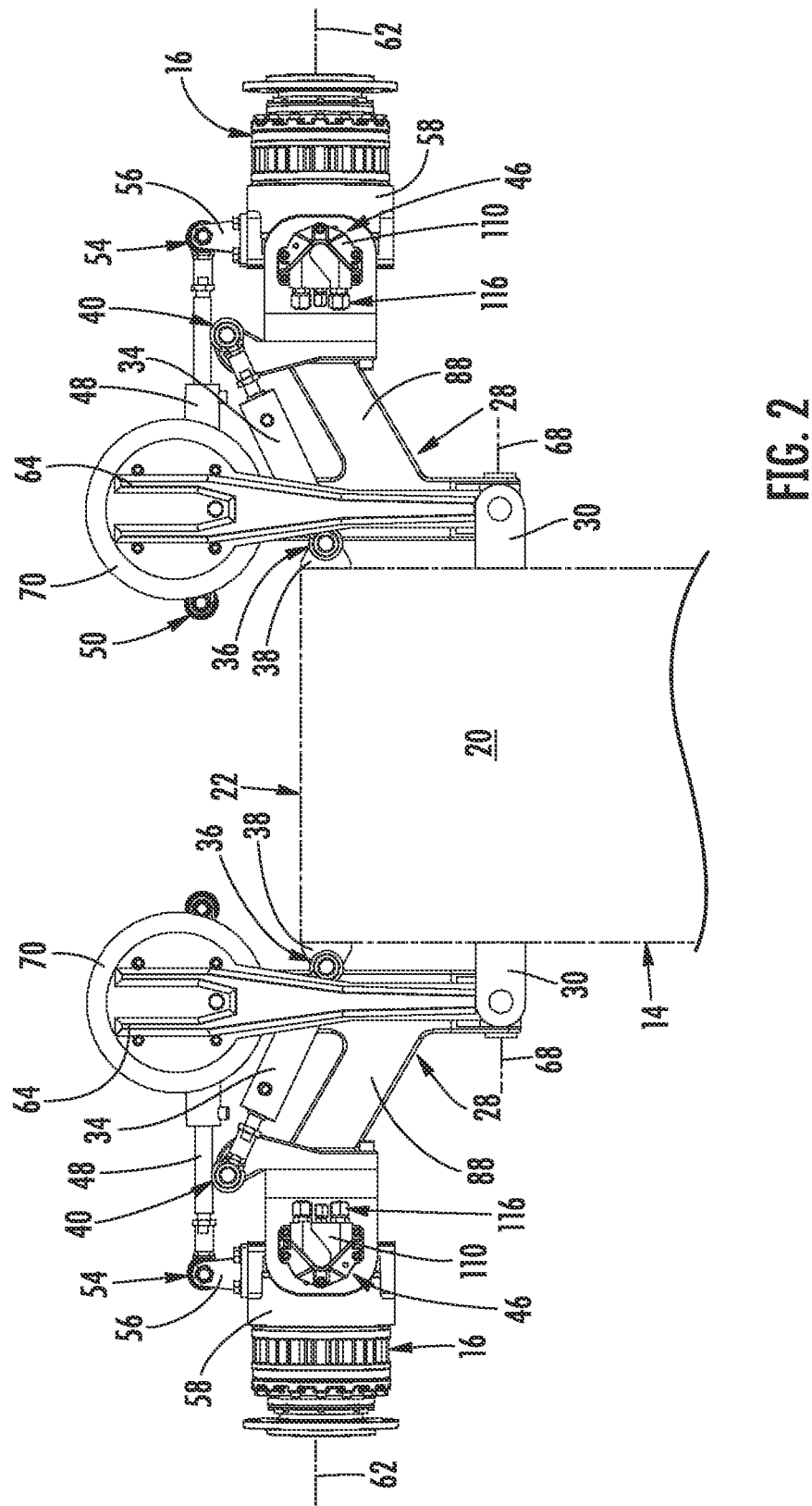
FIG. 2 is a top plan view of the steering system shown in FIG. 1.
Figure 3:
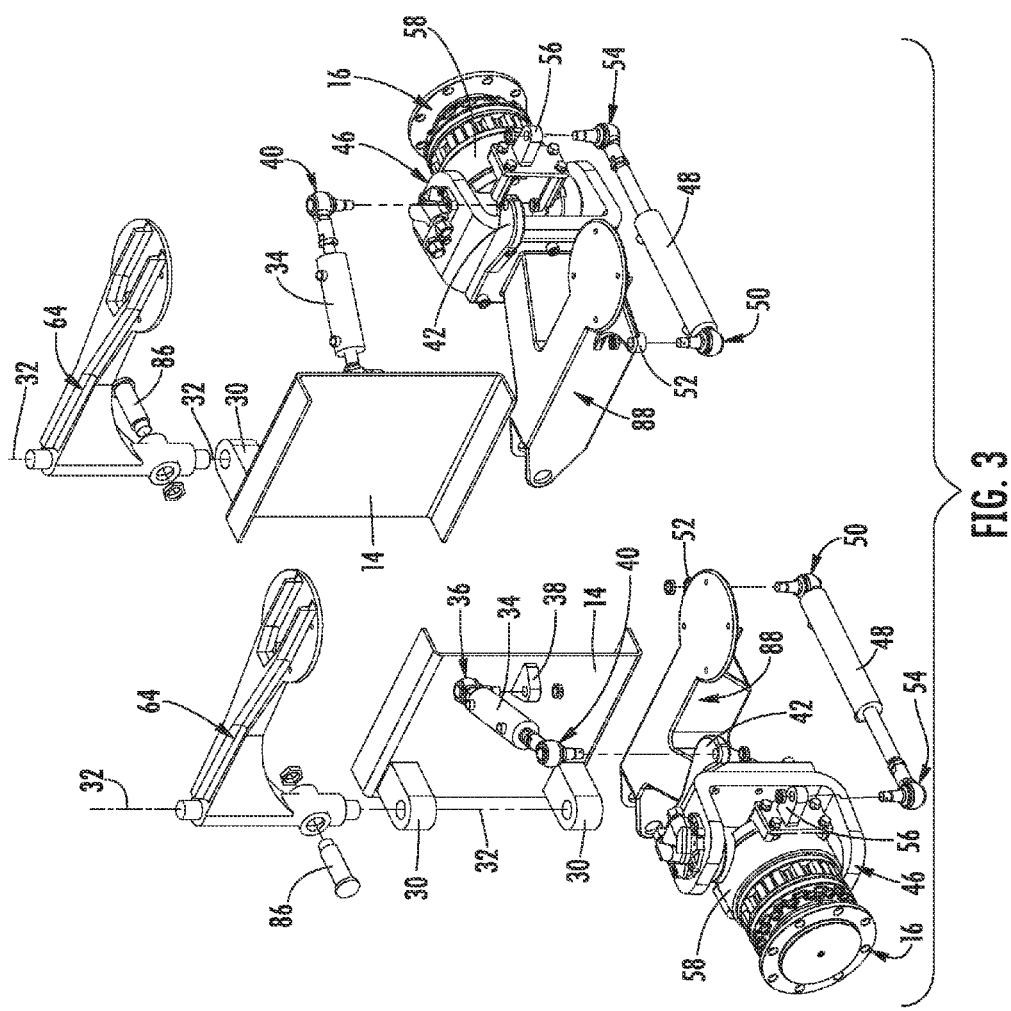
FIG. 3 is an exploded perspective view of the steering system shown in FIG. 1.
Figure 4:
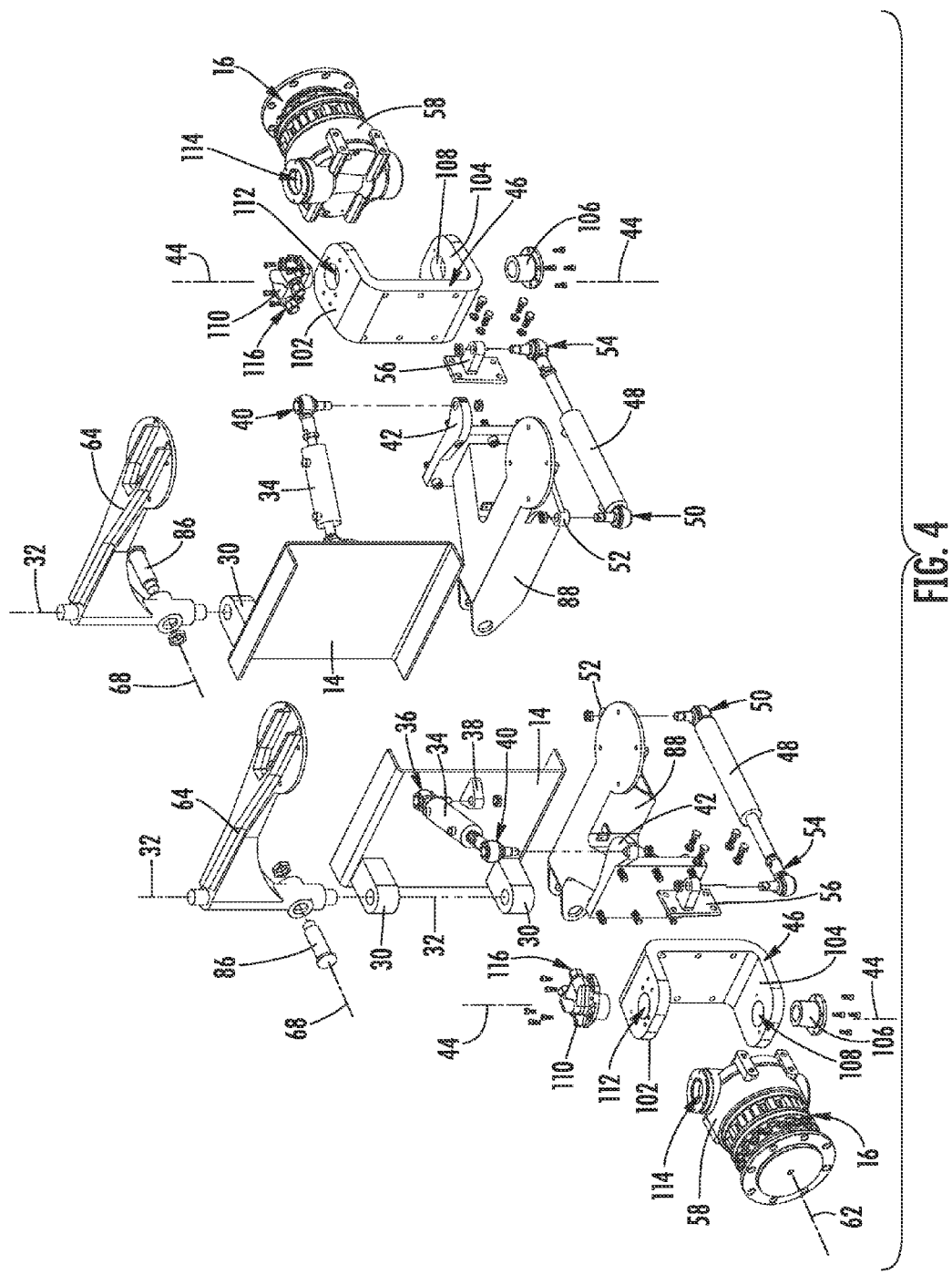
FIG. 4 is an exploded perspective view similar to FIG. 3 and further showing the driven wheel ends detached from the pivot arm.
Figure 5:
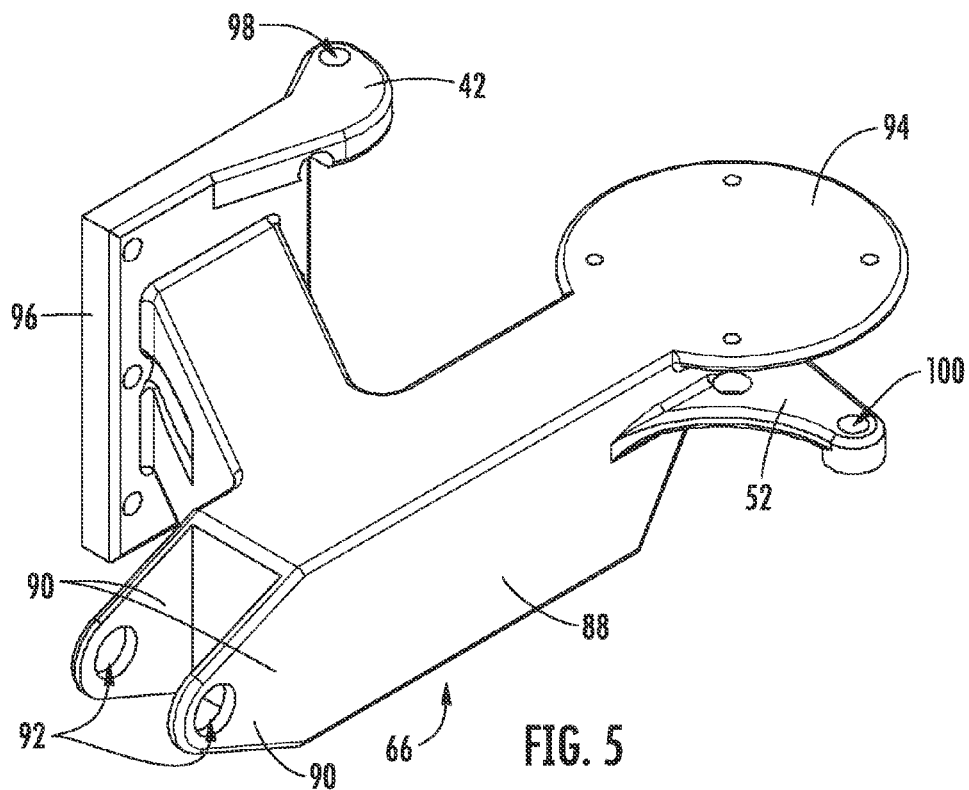
FIG. 5 is a perspective view depicting a lower control arm of the pivot arm of the steering system shown in FIG. 1.
Figure 6:
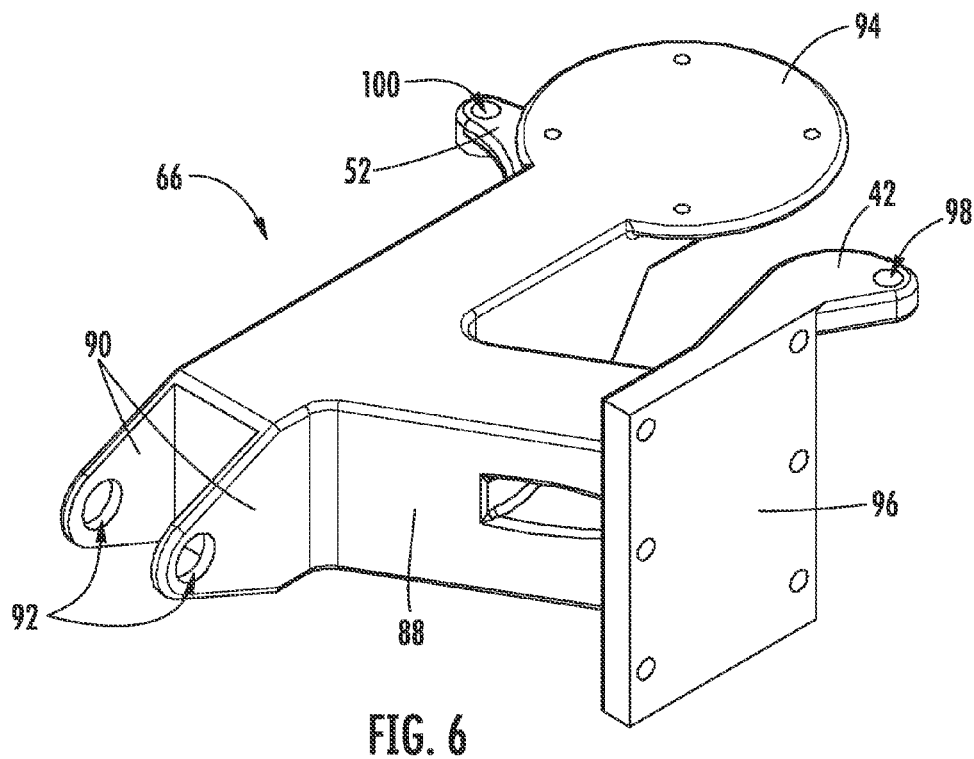
FIG. 6 is another perspective view depicting a lower control arm of the pivot arm of the steering system shown in FIG. 1.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

A land vehicle steering system constructed in accordance with the principles of the present invention is shown in the drawings and generally designated by the numeral 10. Steering system 10 includes left and right steering assemblies 12 which are essentially identical mirror images of one another and are mounted to the left and right sides of a vehicle frame or chassis 14. Steering assemblies 12 each include a wheel end 16. Steerable wheels 18 are mounted onto the wheel ends 16 and are steerable as seen in FIGS. 8-14 and 16.

Figure 8:
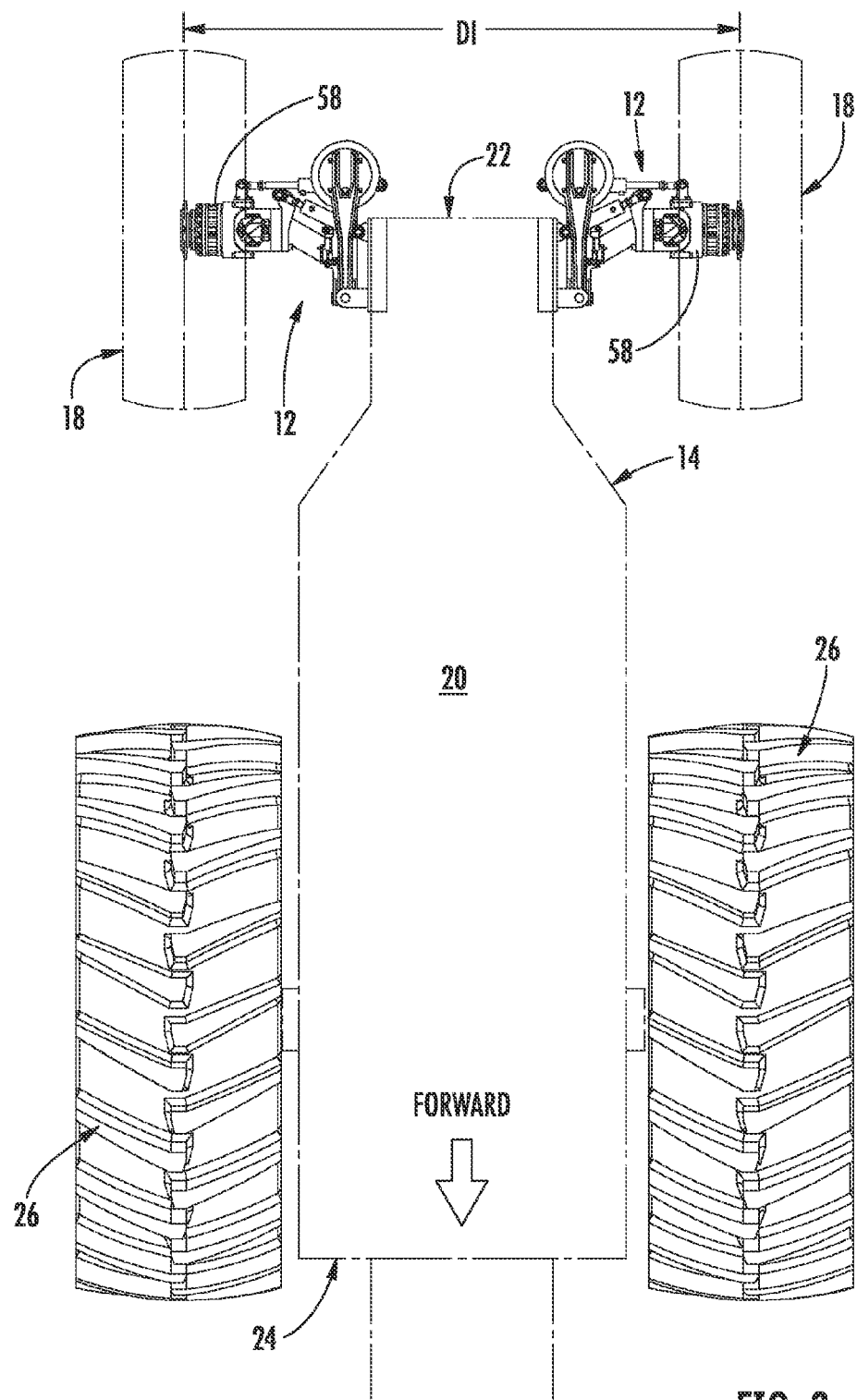
FIG. 8 is a top plan view diagrammatically depicting a land vehicle comprising the steering system of FIG. 1 and wherein the pivot arms are in their retracted inboard positions and the steerable wheels are in their inboard positions.
Figure 9:
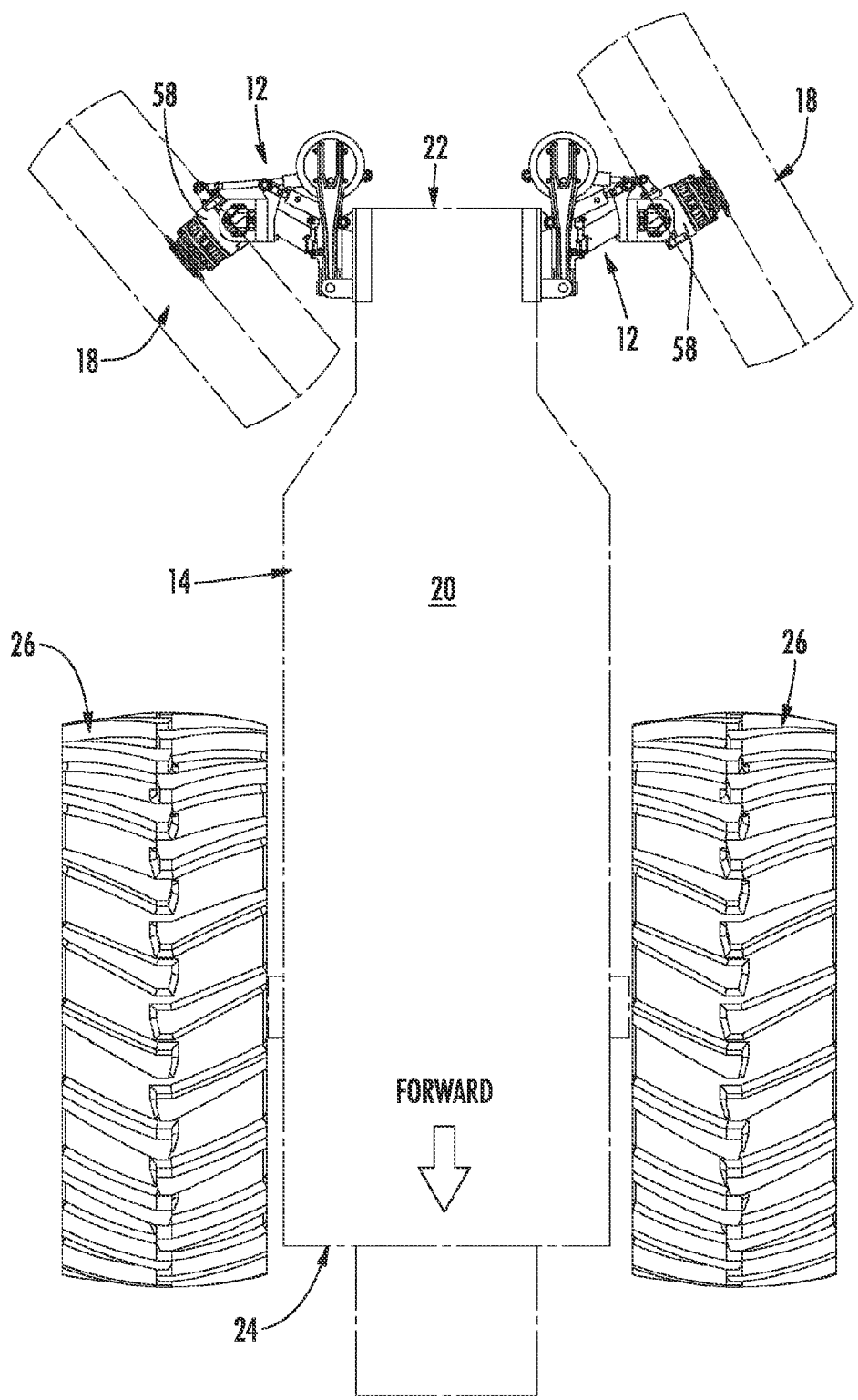
FIG. 9 is a top plan view similar to FIG. 8 but wherein the wheel ends have been turned to the left.
Figure 10:
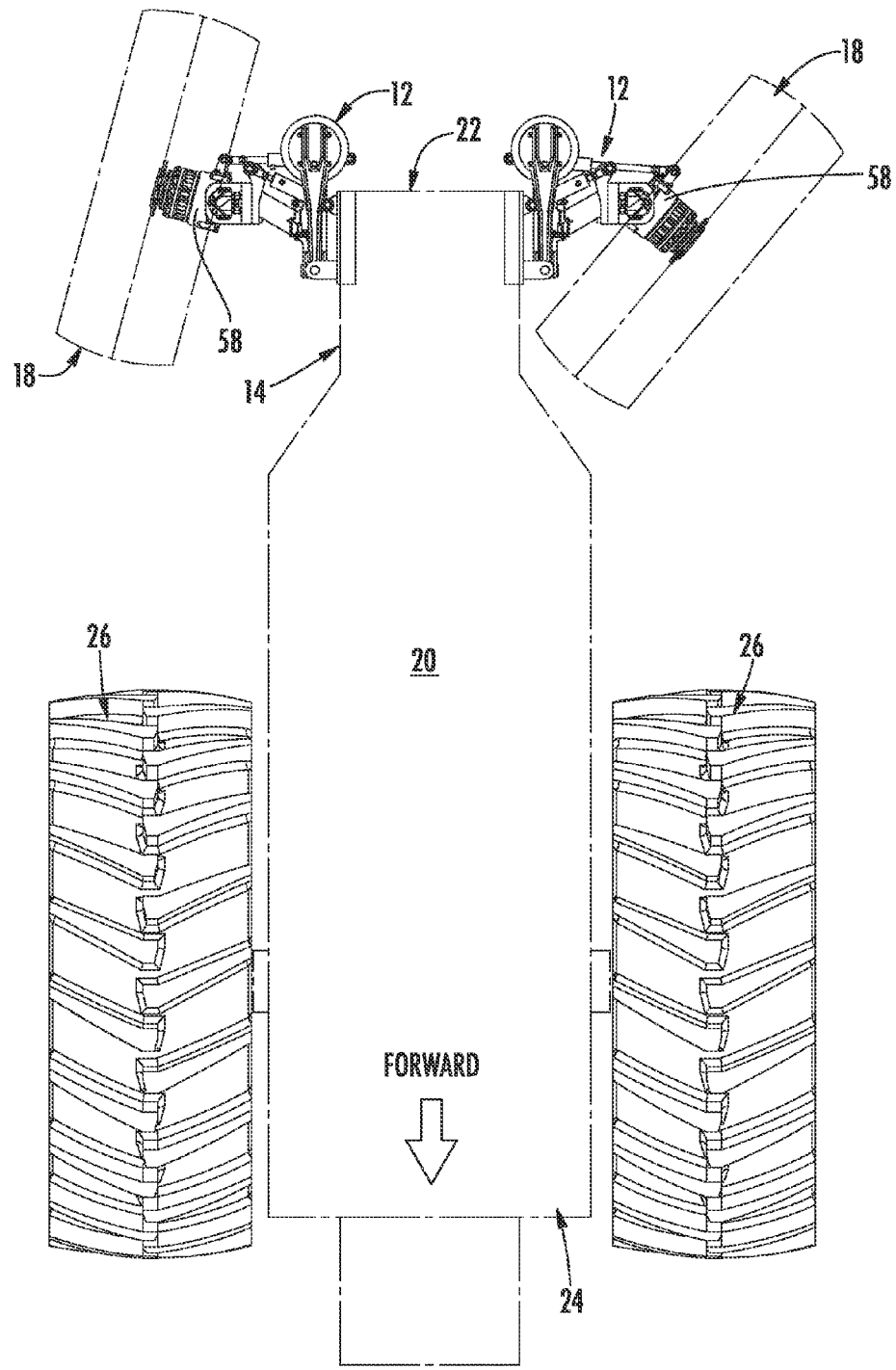
FIG. 10 is a top plan view similar to FIG. 8 but wherein the wheel ends have been turned to the right.
Figure 11:
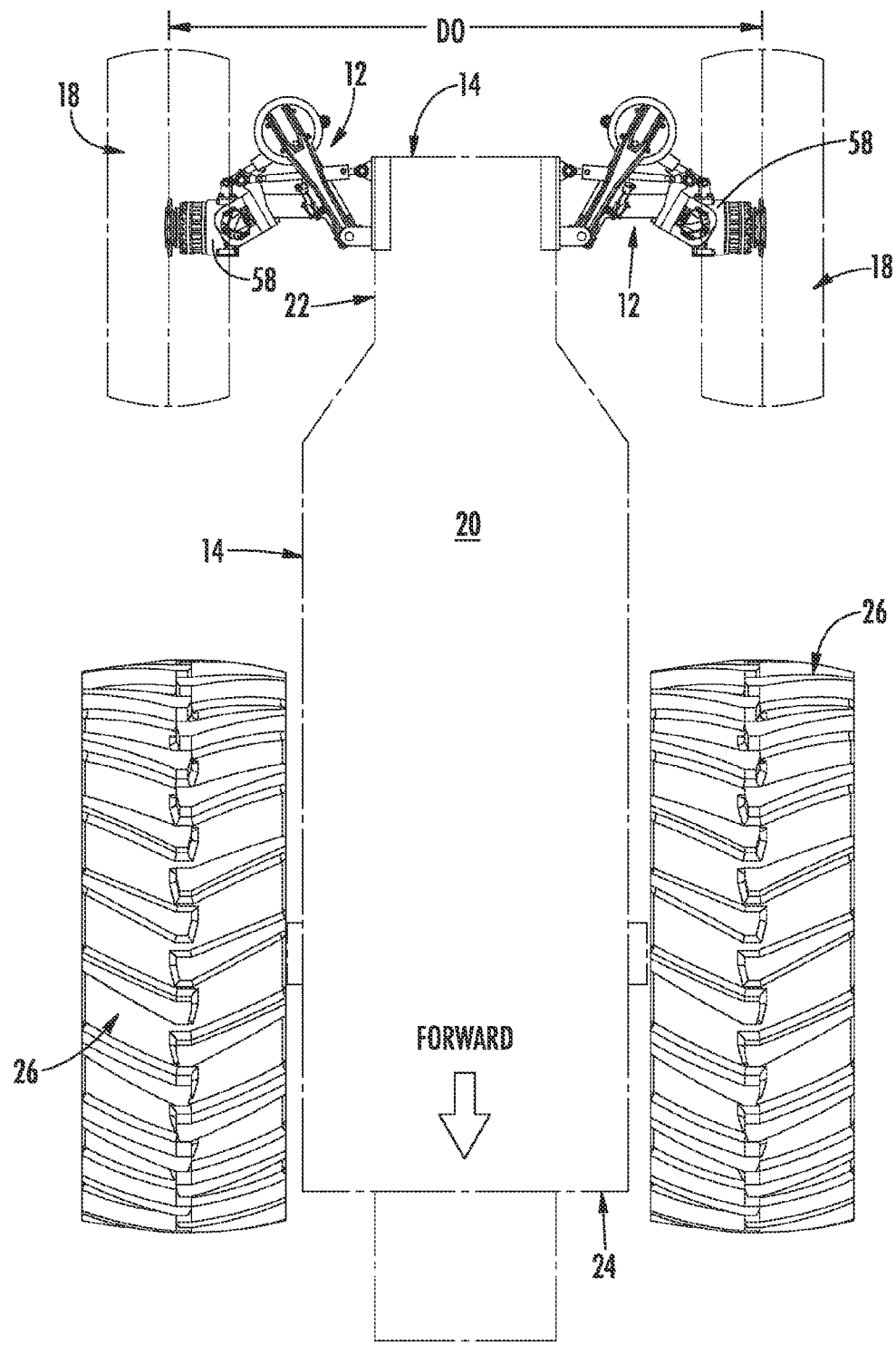
FIG. 11 is a top plan view similar to FIG. 8 but wherein the pivot arms are in their extended outboard positions and the steerable wheels are in their outboard positions.
Figure 12:
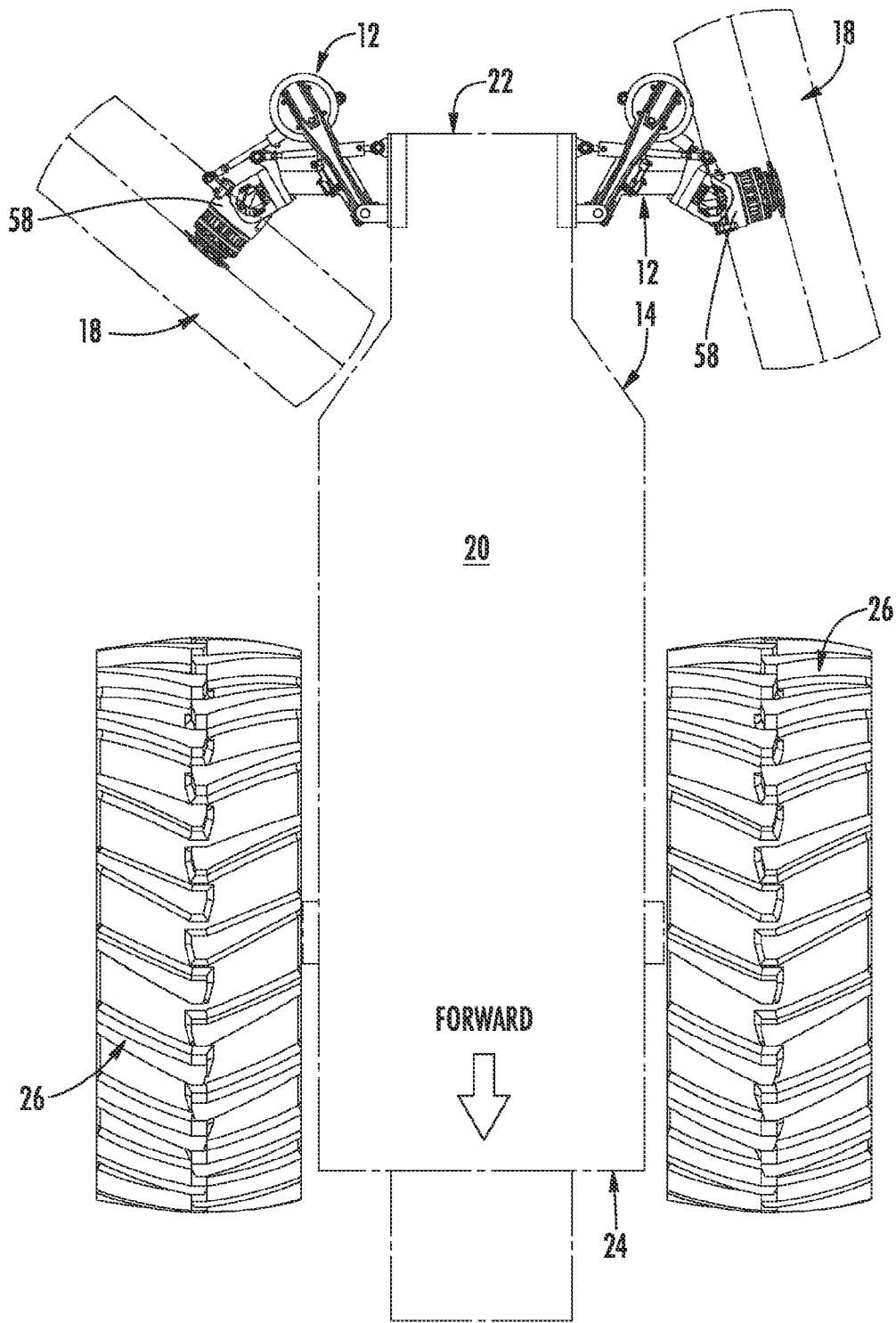
FIG. 12 is a top plan view similar to FIG. 11 but wherein the wheel ends have been turned to the left.
Figure 13:
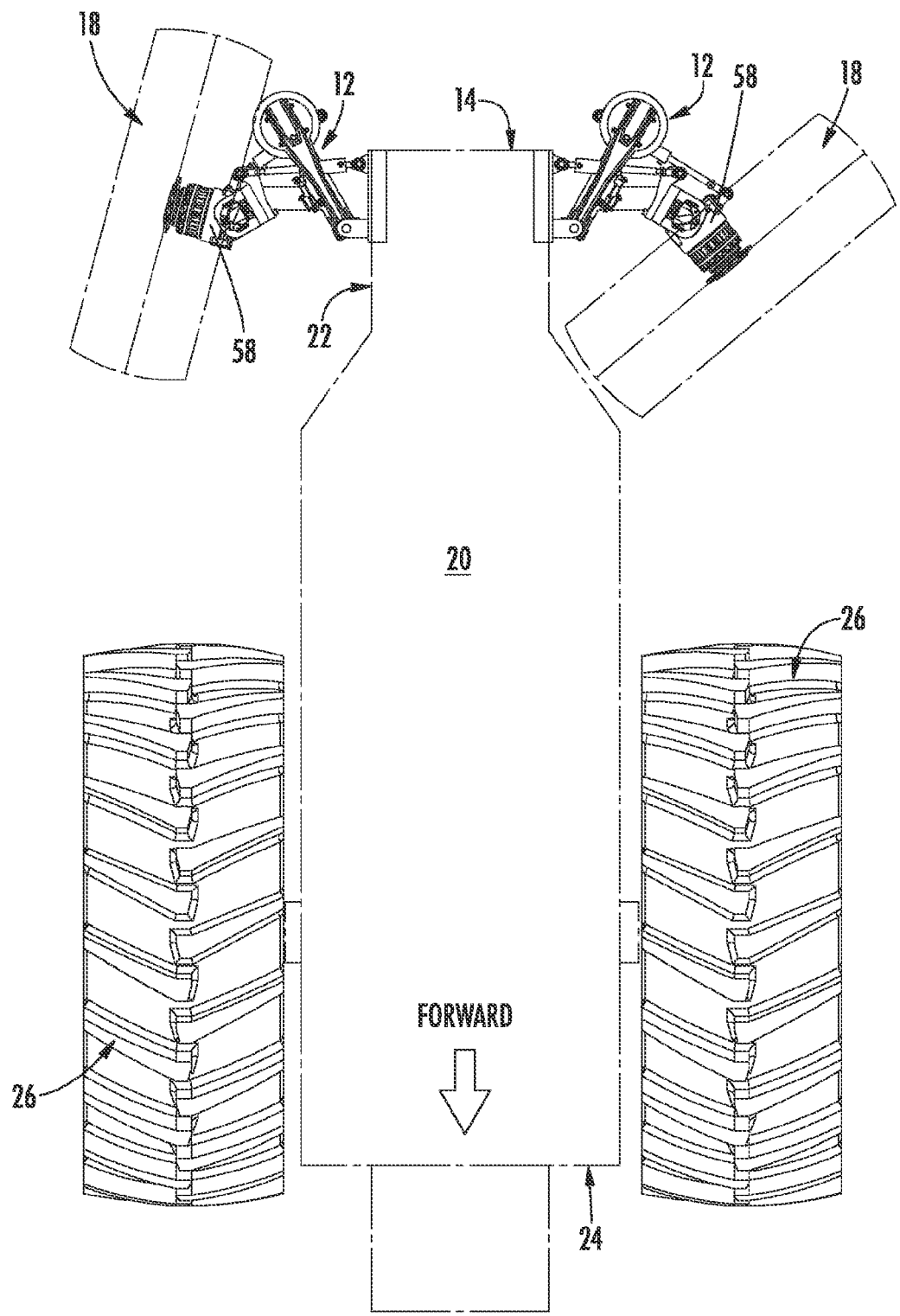
FIG. 13 is a top plan view similar to FIG. 11 but wherein the wheel ends have been turned to the right.

As more fully described hereinbelow, steering assemblies 12 are each also adapted to selectively move the steerable wheels 18 between their inboard or retracted positions as shown in FIGS. 8-10 and their outboard or extended positions as shown in FIGS. 11-13. That is, steering assemblies 12 are adapted to move the steerable wheels 18 between their inboard positions whereat the left and right steerable wheels are spaced a shorter distance DI from one another (FIG. 8), and their outboard positions whereat the left and right steerable wheels are spaced a greater distance DO and further apart from one another (FIG. 11). The steerable wheels 18 are selectively movable and can be located anywhere between their fully retracted inboard and fully extended outboard positions and, indeed, each left or right steerable wheel 18 is selectively movable between its inboard and outboard positions independent of the other left or right steerable wheel 18.

In FIGS. 8-14 and 16, the steering system 10 is mounted to and supports the rear end 22 of a land vehicle 20 such as, for example, a combine. The front end 24 of the vehicle 20 is supported by wheels 26. Steering system 10 can, of course, also be used at the front end 24 of the land vehicle 20. It can also be used on all types of steerable land vehicles including, but not limited to, trucks, construction vehicles, automobiles, recreational vehicles, etc.

For simplicity and clarity purposes, the several components and elements of the left and right steering assemblies 12 are identified and referred to herein using the same reference numerals, regardless of whether such components or elements are in a left steering assembly or a right steering assembly.

Referring now more particularly to FIGS. 1-7, steering assemblies 12 include a pivot arm 28 pivotally secured to the vehicle frame 14, such as with bracket ears 30 attached to the frame 14, and is adapted to pivot about a generally vertical first pivot axis 32. A first selectively extendable and retractable mechanism such as a hydraulic cylinder 34 is pivotally secured at one end 36 thereof to the vehicle frame 14, such as with a bracket ear 38 attached to the frame 14. The other end 40 of the first hydraulic cylinder 34 is pivotally secured to the pivot arm 28 such as with a bracket ear 42 which is attached to the pivot arm 28. Accordingly, by retracting and extending the first hydraulic cylinder 34, the pivot arm 28 is selectively pivotable about the first pivot axis 32. By retracting first hydraulic cylinder 34, the pivot arm 28 can be pulled to its retracted inboard position as seen in FIGS. 8-10 whereas, by extending first hydraulic cylinder 34, the pivot arm 28 can be pushed to its extended outboard position as shown in FIGS. 11-13.

The wheel end 16 of each of the steering assemblies 12 is pivotally secured to the pivot arm 28, such as with a yoke or C-shaped bracket 46 attached to the pivot arm 28, and is adapted to pivot about a generally vertical second or steering pivot axis 44. A second selectively extendable and retractable mechanism such as a hydraulic cylinder 48 is pivotally secured at one end 50 thereof to the pivot arm 28, such as with a bracket ear 52 attached to the pivot arm 28. The other end 54 of the second hydraulic cylinder 48 is pivotally secured to the wheel end 16 such as with a bracket ear 56 which is attached to the wheel end 16. Accordingly, by retracting and extending the second hydraulic cylinder 48, wheel end 16 is selectively pivotable about the second pivot axis 44 and a steerable wheel 18 mounted thereon is thereby selectively pivotable/steerable between its left and right directions as shown in FIGS. 8-13.

Figure 14:
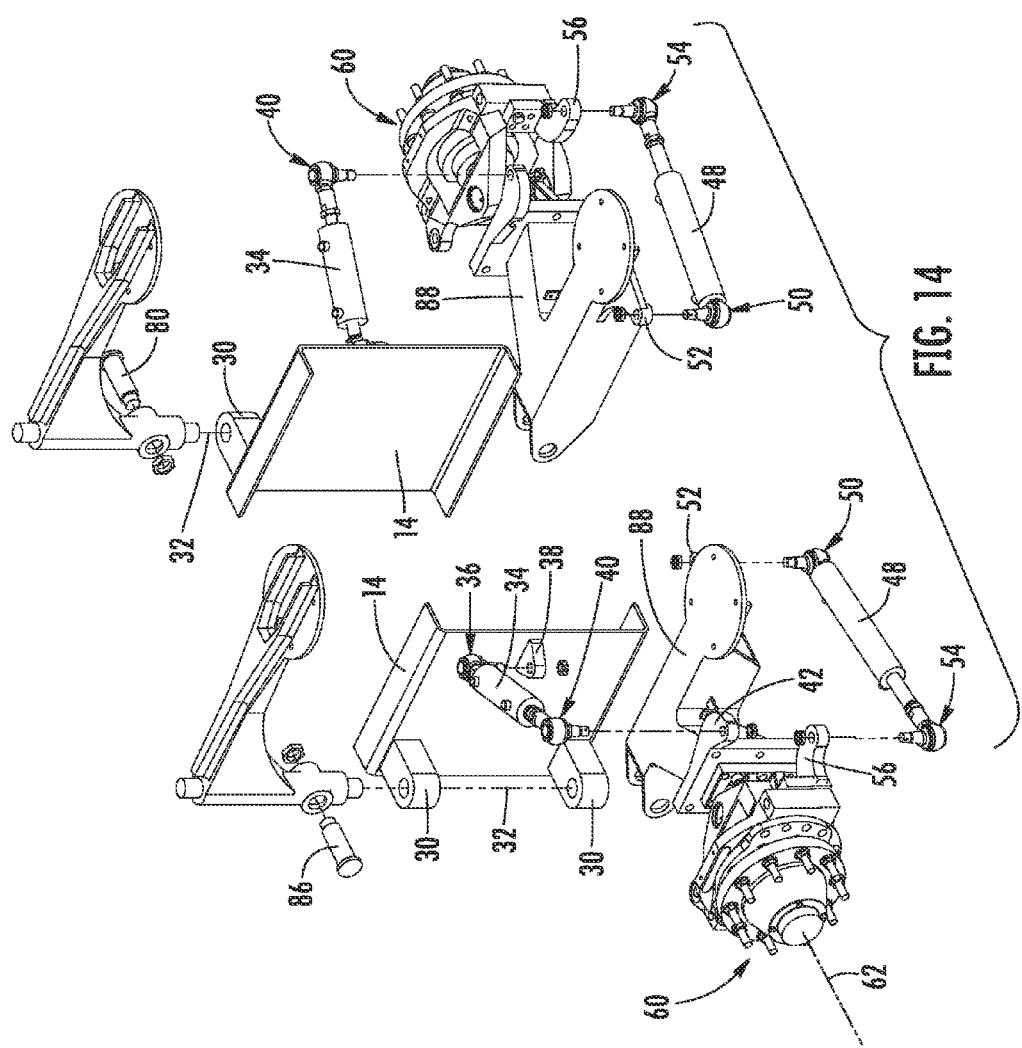
FIG. 14 is an exploded perspective view of the steering system shown in FIG. 1 but wherein the wheel ends are non-driven spindles.
Figure 15:
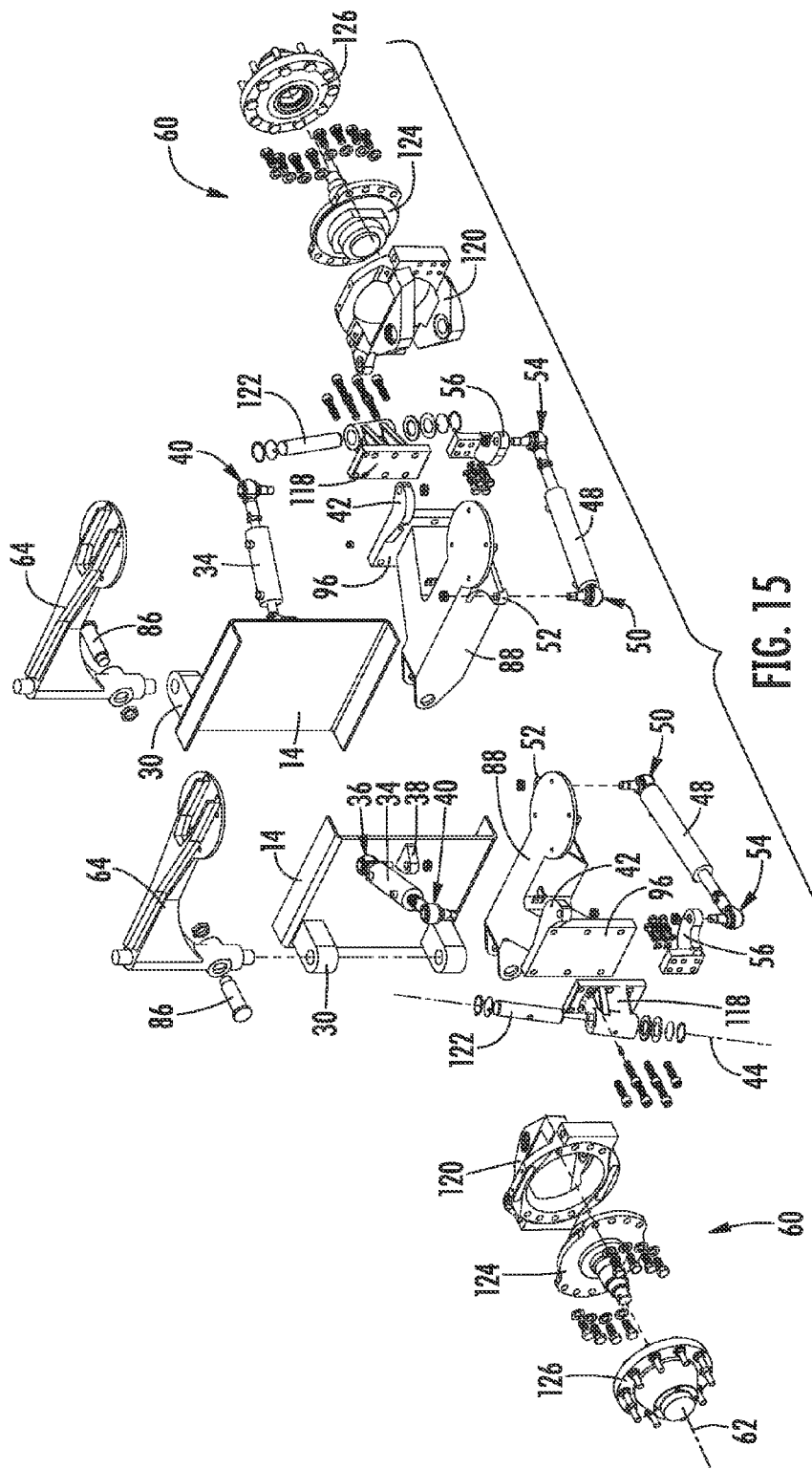
FIG. 15 is an exploded perspective view similar to FIG. 14 and further showing the non-driven spindle wheel ends detached from the pivot arm; and, FIG. 16 is a top plan view similar to FIG. 8 but wherein the wheel ends are non-driven stub axles.
Figure 16:
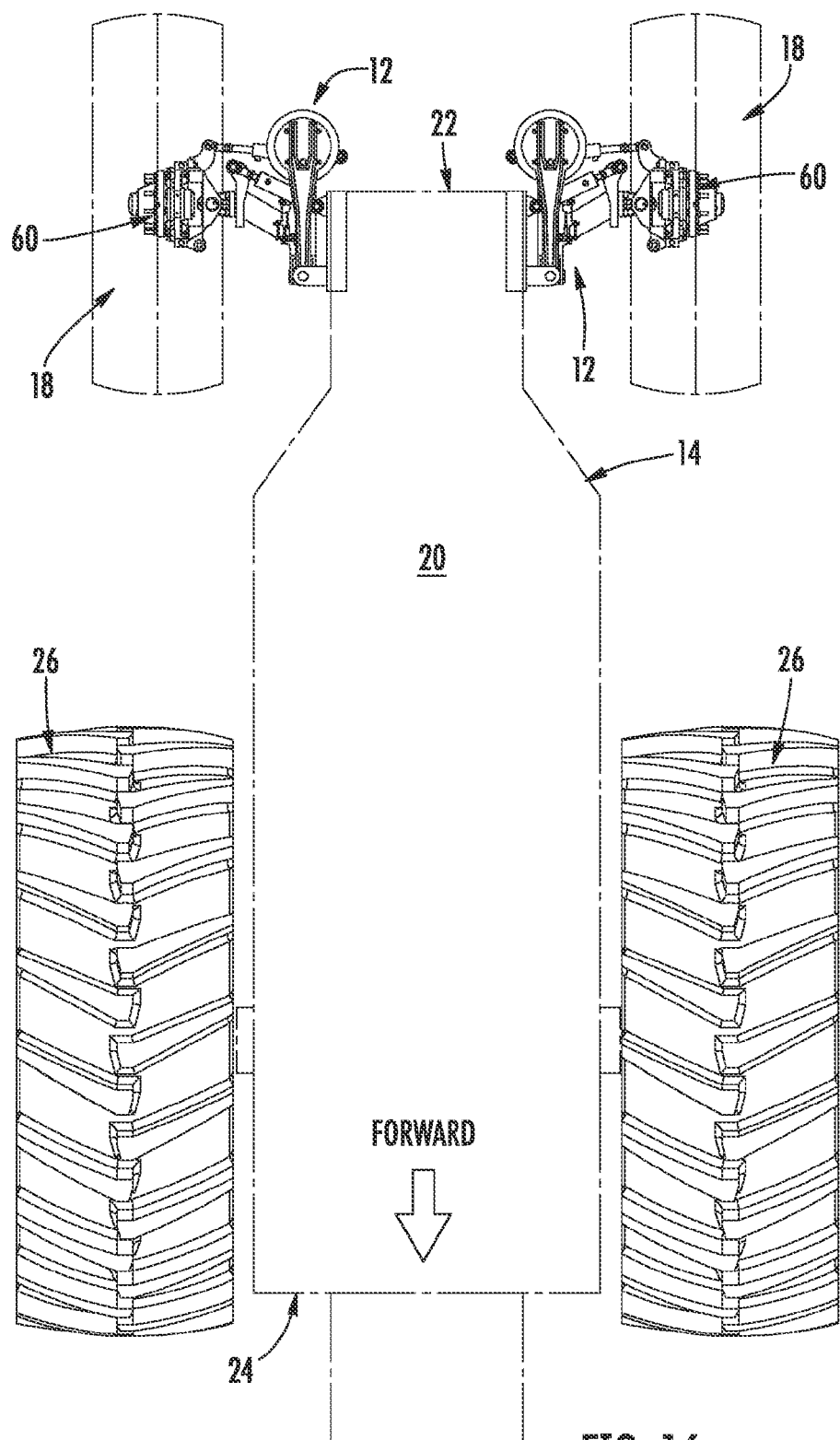

The wheel ends 16 can be hydraulically or electrically driven wheel motors 58 as depicted in FIGS. 1-4 and 8-13 or non-driven stub axles 60 as depicted in FIGS. 14-16. In either case, of course, the steerable wheels 18 are mounted thereto and the wheel ends 16 and wheels 18 are adapted to rotate about a generally horizontal wheel axis of rotation 62.

The pivot arm 28 can be a simple cantilevered arm pivotally secured at one end thereof to the vehicle frame 14 about the first pivot axis 32 and simply having the wheel end 16 pivotally secured thereto about the second pivot axis 44 as described hereinabove. Preferably, however, the pivot arm 28 is constructed having suspension means incorporated therewith as described hereinafter and shown in the drawings. In this regard, the pivot arm 28 is constructed with a first or upper rigid control arm 64 pivotally secured to the vehicle frame 14 about the first pivot axis 32, and a second or lower rigid control arm 66 pivotally secured to the upper control arm 64 about a generally horizontal suspension pivot axis 68. Because the suspension pivot axis 68 is generally perpendicular to the first pivot axis 32 and the lower control arm 66 is pivotally secured to and carried by the upper control arm 64, both the upper and lower control arms 64, 66 are adapted to simultaneously/together pivot about the first vertical axis 32. A spring, preferably in the form of an air spring 70, is provided between the upper and lower control arms 64, 66. Accordingly, the vehicle 20 weight/load is carried from the upper control arm 64 through the spring 70 to the lower control arm 66 and to the wheel end 16 and steerable wheel 18. The upper control arm 64 is thereby insulated from sudden impacts or shocks experienced by the wheel 18. It is noted that a shock absorber/dampener (not shown) can also be provided between the upper and lower control arms 64, 66.

Figure 7:
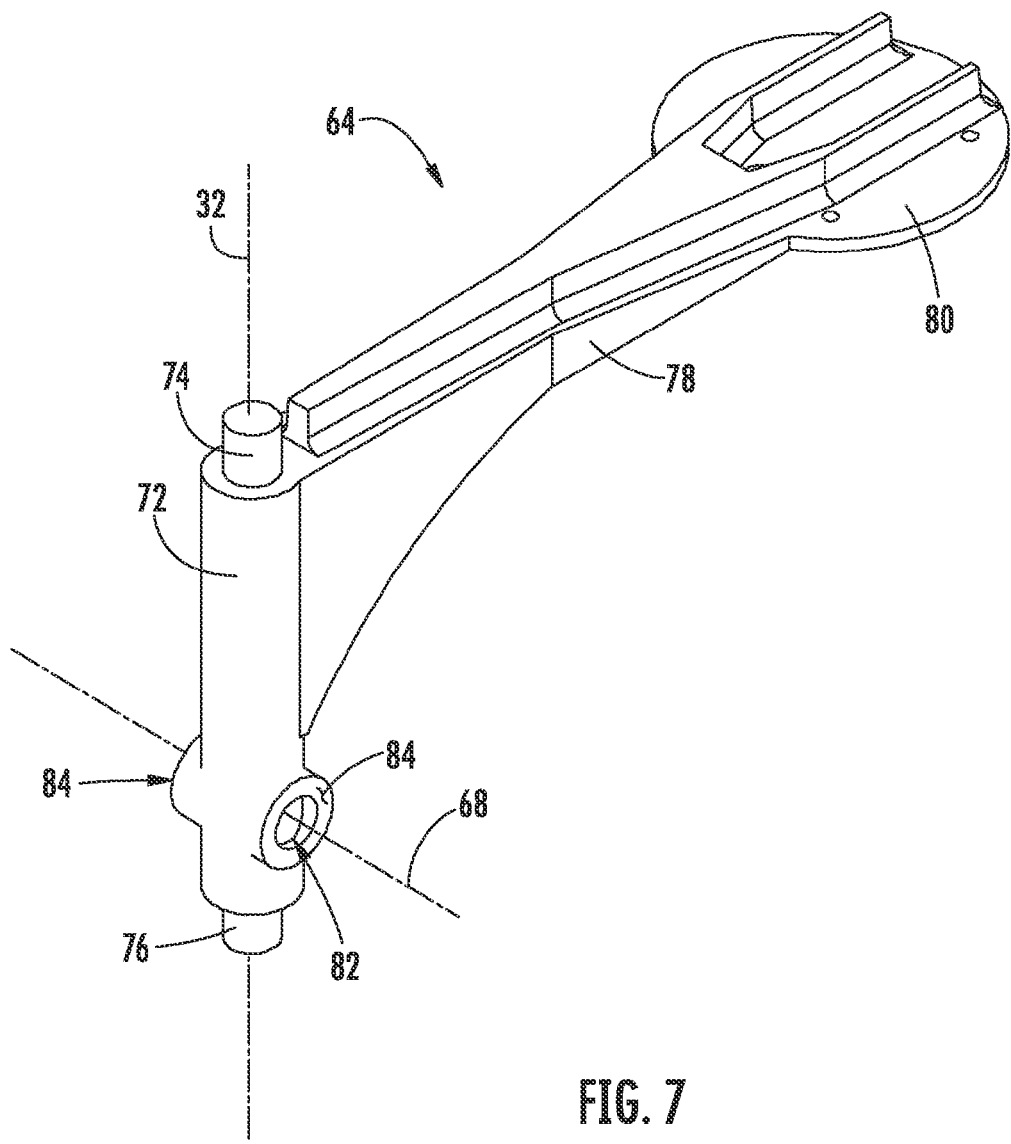
FIG. 7 is a perspective view depicting the upper control arm of the pivot arm of the steering assembly shown in FIG. 1.

As best seen if FIG. 7, the upper control arm includes a shaft portion 72 including an upper pin 74 at its upper end thereof and a lower pin 76 at its lower end thereof. Upper pin 74 is rotatably received within a bore extending into the upper bracket ear 30 and lower pin 76 is rotatably received within a bore extending into the lower bracket ear 30. Accordingly, shaft portion 72 thereby rotates about the first pivot axis 32. A cantilevered arm 78 is preferably integrally formed with and extends radially/perpendicularly from the shaft portion 72. An upper spring seat 80 is provided at the terminal end of the cantilevered arm 78. A horizontal bore 82 extends through the shaft portion 72 between end faces 84. Horizontal bore 82 is collinear with the horizontal suspension pivot axis 68 and is adapted to rotatably receive a pivot pin 86 therethrough.

As best seen in FIGS. 8 and 9, the lower control arm 66 includes a body or frame 88. A pair of parallel blades 90 extend from the lower control arm body 88 and are provided with aligned holes 92. As best seen in FIG. 1, the upper arm shaft portion 72 is received between the parallel blades 90 with the end faces 84 thereof abutting a perspective blade 90 and with the upper control arm horizontal bore 82 aligned with the blades holes 92. The pivot pin 86 is received through the aligned horizontal bore 82 and blades holes 92 thereby pivotally securing the lower control arm body 88 to the upper control arm shaft portion 72.

A lower spring seat 94 is provided on the lower control arm body 88 and is generally aligned with the upper spring seat 80. The air spring 70 is secured to and between the upper and lower seats 80, 94 in a known and customary manner.

An attachment plate 96 is provided on the lower control arm body 88 whereat the C-shaped bracket 46 is attached with fasteners as shown or other suitable means. Alternatively, a C-shaped bracket or yoke can be formed directly into the body 88 for pivotally securing a wheel end 16 thereto. The bracket ear 42 having a hole 98 is provided on the attachment plate 46 for pivotally securing the end 40 of the hydraulic cylinder 34. The bracket ear 42 can, of course, be located elsewhere on the lower control arm body 88 as may be needed. Bracket ear 52 having a hole 100 is also provided on the lower control arm body 88 as shown.

As should be appreciated by one skilled in the art, the lower control arm body 88 can take on various shapes so as to accommodate the various vehicles and the desired design criteria. However, it will essentially include a pivotal connection to the upper control arm 64, a spring seat 94, a bracket ear 42 or other means for pivotally attaching to the hydraulic cylinder 34, a bracket ear 52 or other means for pivotally attaching to the hydraulic cylinder 48, and a C-shaped bracket 46 secured thereto or other means for pivotally attaching the wheel end 16 thereto. Similarly, the upper control arm 64 can take on various shapes but will, essentially, include a pivotal connection to the vehicle so as to rotate about pivot axis 32, a horizontal bore 82 or other means for pivotally attaching the lower control arm 66 thereto, and a spring seat 80.

The wheel ends 16 shown in FIGS. 1-4 are hydraulically driven motors 58. Motors 58 are pivotally secured between the upper and lower legs 102, 104 of the C-shaped bracket 46. In this regard, a pivot plug 106 extends through the hole 108 in the lower leg 104 and into a bore (not shown) in the housing of the driven motor 58. Similarly, a pivot plug 110 extends through the hole 112 in the upper leg 102 and into the bore 114 in the housing of the driven motor 58. Preferably, pivot plug 110 includes hydraulic ports 116 for providing hydraulic oil and powering the driven motor 58 in a known and customary manner. The pivot plugs 106, 110 essentially function similar to a king pin for pivotally securing the wheel end motor 58 to the lower control arm 66 of the pivot arm 58.

As mentioned hereinabove, wheel ends 16 can also be non-driven stub axles 60 as shown in FIGS. 14-16. In this embodiment, a yoke 118 is attached to the attachment plate 96 of the lower control arm body 88 with fasteners or other suitable means. A steering knuckle 120 is pivotally secured to the yoke 118 with a king pin 122 in a known and customary manner. A spindle 124 is rigidly secured to the steering knuckle 120 with fasteners or other suitable means. The bracket ear 56, in this embodiment, is secured to the steering knuckle 120/spindle 124 and the end 54 of the second hydraulic cylinder 48 is pivotally secured thereto. A wheel hub 126 is rotatably secured to the spindle 124 in a known and customary manner for attaching the steerable wheels 18 thereto. Accordingly, the non-driven stub axle 60 and wheels 18 mounted thereon are carried on the lower control arm 66 of the pivot arm 28 and are selectively rotatable about the steering pivot axis 44 by selectively extending and retracting the second hydraulic cylinder 48.

As should now be appreciated, each of the left and right steering assemblies 12 can be operated independent of one another, although typically the deployment of the pivot arms 28 will be coordinated so as to maintain the vehicle 20 centered between the wheels 18. Similarly, the rotational position of the left and right wheel ends 18 about their steering pivot axes 44 will be coordinated so as to steer the vehicle 20 in the desired direction. In this regard, the pivot arms 28 can be moved between their retracted inboard positions and their extended outboard positions, and anywhere in between, by retracting and extending the hydraulic cylinders 34 and rotating the pivot arms 28 about the first pivot axis 32. Simultaneously, the wheel ends 16 carried on each of the pivot arms 28 can be rotated about their steering pivot axis 44 by retracting and extending the hydraulic cylinders 48 for thereby placing the steerable wheels 18 thereof in the desired angle/position for steering the vehicle 20 as may be desired.

While this invention has been described as having an exemplary design, the present invention may be further modified within the spirit and scope of this disclosure. This application is therefore intended to cover any variations, uses, or adaptations of the invention using its general principles.

What is claimed is:
1. A steering system including left and right steering assemblies for a land vehicle, wherein each of said left and right steering assemblies comprises:
    a pivot arm pivotally secured to the vehicle about a first pivot axis;
    a first selectively extendable and retractable mechanism secured between said pivot arm and the vehicle;
    a wheel end pivotally secured to said pivot arm about a steering axis whereupon a steerable wheel is mountable; and,
    a second selectively extendable and retractable mechanism secured between said wheel end and said pivot arm, whereby actuation of said first mechanism rotates said pivot arm about said first pivot axis and moves said wheel end inboard and outboard of the vehicle and actuation of said second mechanism rotates said wheel end relative to said pivot arm for steering the vehicle; and,
    wherein each said pivot arm comprises:
    a first control arm pivotally secured about said first pivot axis;
    a second control arm pivotally secured to said first control arm about a suspension axis;

a spring between said first control arm and said second control arm;

wherein said wheel end is pivotally secured to said second control arm; and, wherein said second mechanism is secured between said wheel end and said second control arm.

2. The steering system of claim 1 wherein said first mechanism is secured between said second control arm and the vehicle.

3. The steering system claim 1 wherein said selectively extendable and retractable mechanisms are hydraulic cylinders.

4. The steering system of claim 1 wherein said wheel end is a hydraulically driven wheel motor.

5. The steering system of claim 1 wherein said wheel end is a non-driven stub axle.

6. The steering system of claim 1 wherein said spring is an air spring.

7. The steering system of claim 1 wherein said suspension axis is generally perpendicular to said first pivot axis.

8. A steering system including left and right steering assemblies for a land vehicle, wherein each of said left and right steering assemblies comprises:
   a pivot arm pivotally secured to the vehicle about a first pivot axis whereby said pivot arm is moveable between inboard and outboard positions;
   a wheel end pivotally secured to said pivot arm about a steering axis whereupon a steerable wheel is mountable; and,
   a selectively extendable and retractable steering mechanism secured between said wheel end and said pivot arm, whereby rotation of said pivot arm about said first pivot axis moves said wheel end inboard and outboard of the vehicle and actuation of said steering mechanism rotates said wheel end relative to said pivot arm for steering the vehicle; and, wherein each said pivot arm comprises:
   a first control arm pivotally secured about said first pivot axis;
   a second control arm pivotally secured to said first control arm about a suspension axis;
   a spring between said first co arm and said second control arm;
   wherein said wheel end is pivotally secured to said second control arm; and,
   wherein said steering mechanism is secured between said wheel end and said second control arm.

9. The steering system of claim 8 wherein said wheel end is a hydraulically driven wheel motor.

10. The steering system of claim 8 wherein said wheel end is a non-driven stub axle.

11. The steering system of claim 8 wherein said spring is an air spring.

12. The steering system of claim 8 wherein said suspension axis is generally perpendicular to said first pivot axis.

13. The steering system of claim 8 further comprising a selectively extendable and retractable mechanism secured between said second control arm and the vehicle for rotating said pivot arm about said first pivot axis.

14. The steering system of claim 13 wherein said selectively extendable and retractable mechanisms are hydraulic cylinders.

* * * * *